United States Patent [19]

Bennett

[11] 4,025,773

[45] May 24, 1977

[54] ENHANCED APPARATUS FOR BINARY QUOTIENT, BINARY PRODUCT, BINARY SUM AND BINARY DIFFERENCE GENERATION

[75] Inventor: Walter Scott Bennett, Loveland, Colo.

[73] Assignee: Burroughs Corporation, Detroit, Mich.

[22] Filed: Dec. 15, 1975

[21] Appl. No.: 639,516

Related U.S. Application Data

[63] Continuation of Ser. No. 489,886, July 19, 1974, abandoned.

[52] U.S. Cl. .............................................. 235/164
[51] Int. Cl.² ........................................ G06F 7/52
[58] Field of Search ................................... 235/164

[56] References Cited

UNITED STATES PATENTS

| | | | |
|---|---|---|---|
| 3,591,787 | 7/1971 | Friman | 235/164 |
| 3,633,018 | 1/1972 | Ling | 235/164 |
| 3,648,038 | 3/1972 | Sierra | 235/164 |
| 3,752,971 | 8/1973 | Calhoun | 235/164 |
| 3,777,132 | 12/1973 | Bennett | 235/164 |

OTHER PUBLICATIONS

M. J. Flynn, "On Division by Functional Iteration" *IEEE Trans. on Computers* vol. C–19, No. 8 pp. 702–706, Aug. 1970.

*Primary Examiner*—David H. Malzahn
*Attorney, Agent, or Firm*—Nathan Cass; Kevin R. Peterson; Edward J. Fenney, Jr.

[57] ABSTRACT

Three modular arrays structured from a common module are connected together a first way to form a binary quotient by successive approximations, or a second way to form a binary product. Any one of the three modular arrays may be used to add or subtract two binary numbers. To divide, one array is utilized to effectively form the reciprocal of the binary divisor, most significant bit first, by successive approximation. Control circuitry, including a carry detector, dictates the formation of the shift and add sequence that effectively represents the reciprocal of the divisor by controlling the positioning of the divisor before each addition step so that the product is a series of binary ones. The add and shift sequence utilized to generate the series of binary ones, as it is evolving, is also being utilized to manipulate the dividend, thereby forming the quotient, most significant bit first. In effect, the dividend is being multiplied by the reciprocal of the divisor so as to form an approximate product of the dividend and reciprocal of the divisor, most significant bit first. This product is actually an increasingly precise approximation of the quotient of the dividend and divisor. The binary product of two numbers is formed, most significant bit first, by manipulating the multiplicand according to an add and shift sequence determined by use of the multiplier.

5 Claims, 10 Drawing Figures

FIG. 1

| STEP | DIVALK DALK | CLOCK | SS | AS | RK | ENCD | ADIKS | AD2KS | CONEN | DIVISOR ARRAY UPPER REG. CELLS / LOWER REG. CELLS | QUOTIENT ARRAY UPPER REG. CELLS | DIVIDEND ARRAY UPPER REG. CELLS / LOWER REG. CELLS |
|---|---|---|---|---|---|---|---|---|---|---|---|---|
| | 1 | 1 | 0 | 0 | 0 | 0 | 0 | 0 | 1 | 00000 / 00000 | 00000 | 00000 / 00000 |
| 1 | 0 | 1 | 1 | 0 | 1 | 0 | 0 | 0 | 1 | 10110 / 10110 | 00000 | 10001 / 10001 |
| 2 | 0 | 1 | 0 | 1 | 1 | 1 | 0 | 1 | 1 | 01100 / 10110 | 00001 | 00010 / 10001 |
| 3 | 0 | 1 | 1 | 0 | 1 | 0 | 0 | 0 | 1 | 10111 / 10110 | 00001 | 01001 / 10001 |
| 4 | 0 | 1 | 0 | 1 | 1 | 1 | 0 | 1 | 1 | 01110 / 10110 | 00010 | 10010 / 10001 |
| 5 | 0 | 1 | 1 | 0 | 1 | 0 | 0 | 0 | 1 | 11001 / 10110 | 00010 | 11010 / 10001 |
| 6 | 0 | 1 | 1 | 0 | 1 | 0 | 0 | 0 | 1 | 10010 / 10110 | 00101 | 10100 / 10001 |
| 7 | 0 | 1 | 0 | 1 | 1 | 1 | 1 | 0 | 1 | 00100 / 10110 | 00101 | 01000 / 10001 |
| 8 | 0 | 1 | 1 | 0 | 1 | 0 | 0 | 0 | 1 | 11010 / 10110 | 00101 | 11000 / 10001 |
| 9 | 0 | 1 | 1 | 0 | 1 | 0 | 0 | 0 | 1 | 10100 / 10110 | 01011 | 10010 / 10001 |
| 10 | 0 | 1 | 0 | 0 | 0 | 0 | 0 | 0 | 0 | 01000 / 10110 | 10111 | 00010 / 10001 |
| 11 | 0 | 1 | 0 | 0 | 0 | 0 | 0 | 0 | 0 | 00000 / 00000 | 00000 | 00000 / 00000 |

CONTROL SIGNALS

| STEP | LALK | ALK | SK | AK | RK | CONEN | CLOCK | MULTIPLIER ARRAY UPPER REGISTER CELLS / LOWER REGISTER CELLS | PRODUCT ARRAY UPPER REGISTER CELLS | MULTIPLICAND ARRAY UPPER REGISTER CELLS / LOWER REGISTER CELLS |
|---|---|---|---|---|---|---|---|---|---|---|
|  | 1 | 0 | 0 | 0 | 1 | 1 |  | 0000000 / 0000000 | 0000000 | 0000000 / 0000000 |
| 1 | 1 | 0 | 1 | 1 | 1 | 1 |  | 1011000 / 1000000 | 0000000 | 0000000 / 1101000 |
| 2 | 0 | 1 | 0 | 1 | 1 | 1 |  | 0011000 / 1000000 | 0000000 | 1101000 / 1101000 |
| 3 | 0 | 1 | 0 | 1 | 1 | 1 |  | 0110000 / 1000000 | 0000001 | 1010000 / 1101000 |
| 4 | 0 | 0 | 1 | 1 | 1 | 1 |  | 1100000 / 1000000 | 0000011 | 0100000 / 1101000 |
| 5 | 0 | 1 | 0 | 1 | 1 | 1 |  | 0100000 / 1000000 | 0000100 | 0010000 / 1101000 |
| 6 | 0 | 0 | 1 | 1 | 1 | 1 |  | 1000000 / 1000000 | 0001000 | 0010000 / 1101000 |
| 7 | 0 | 1 | 0 | 1 | 1 | 1 |  | 0000000 / 1000000 | 0001000 | 1110000 / 1101000 |
| 8 | 0 | 1 | 0 | 1 | 1 | 1 |  | 0000000 / 1000000 | 0010001 | 1110000 / 1101000 |
| 9 | 0 | 1 | 0 | 1 | 1 | 1 |  | 0000000 / 1000000 | 0010011 | 1100000 / 1101000 |
| 10 | 0 | 1 | 0 | 1 | 1 | 1 |  | 0000000 / 1000000 | 0100111 | 1000000 / 1101000 |
| 11 | 0 | 0 | 0 | 0 | 0 | 1 |  | 0000000 / 1000000 | 1001111 | 0000000 / 1101000 |
| 12 | 0 | 0 | 0 | 0 | 0 | 1 |  | 0000000 / 0000000 | 0000000 | 0000000 / 0000000 |

4,025,773

ENHANCED APPARATUS FOR BINARY QUOTIENT, BINARY PRODUCT, BINARY SUM AND BINARY DIFFERENCE GENERATION

This is a continuation of application Ser. No. 489,886, filed July 19, 1974, now abandoned.

CROSS REFERENCE TO RELATED APPLICATIONS

This application is related to application Ser. No. 489,884 filed July 19, 1974, now abandoned in favor of Continuation application Ser. No. 639,517, filed Dec. 15, 1975 for Modular Apparatus for Binary Quotient, Binary Product, Binary Sum and Binary Difference Generation and to application Ser. No. 489,885 filed July 19, 1974, now abandoned in favor of continuation application Ser. No. 639,514, filed Dec. 15, 1975 for Modular Apparatus for Accelerated Generation of a Quotient of Two Binary Numbers.

BACKGROUND OF THE INVENTION

The present invention relates generally to improvements in binary arithmetic mechanisms and more particularly pertains to new and improved multiplication and division apparatus wherein the quotient of two binary numbers is formed by determining the reciprocal of the divisor and multiplying it by the dividend.

Those concerned with the development of binary arithmetic mechanisms have recognized the need for mechanisms that have redundant structure and are able to perform division as inexpensively and as fast as multiplication. Among the arithmetic operations which are most often implemented in digital computer hardware, division stands out as the most complex to control and costly to execute. For example, refer to: *Digital Systems: Hardware Organization and Design*, by F. J. Hill and G. R. Peterson, published by John Wylie and Sons, 1973, and *Design of a Computer — The Control Data 6600*, by J. E. Thornton, published by Scott-Foresman and Company, Glenview, Illinois, 1970. These text books describe division as taken three to four times as long as multiplication.

With few exceptions, previously employed binary arithmetic algorithms have had strong decimal origins. Although conventional decimal approaches to addition, subtraction and multiplication are well adapted to binary machine implementation, the same cannot be said for "pencil and paper" decimal division nor for the Newton-Raphson iterative methods of division. Nevertheless, almost all previously implemented binary division procedures derive from decimal procedures which fall into one or the other of these two categories.

Binary division procedures which do not have strong decimal origins have been reported, for example, by Huei Ling in U.S. Pat. No. 3,633,018, Hugh N. Sierra in U.S. Pat. No. 3,648,038, Goldschmidt and Powers in U.S. Pat. No. 3,508,038 and by W. Scott Bennett in U.S. Pat. No. 3,777,132. The division procedures described in the above patents have one or more relative disadvantages. For example, the method of Goldschmidt and Powers requires a table reference to initiate it and several multiplications to complete it. All the division apparatus described in the above recited publications utilize rather complex non-modular hardware that in each case is largely unique to the division process.

SUMMARY OF THE INVENTION

An object of this invention is to provide an improved high-speed divider mechanism for binary numbers that has highly redundant structure.

A further object of this invention is to provide an improved divider mechanism in a structurally redundant arithmetic mechanism for binary numbers that performs division and multiplication, and yields increasingly precise approximate results, most significant bit first.

These objects and the general purpose of this invention are attained by utilizing a module as the basic building block for the arithmetic mechanism. The modules are connected into three arrays. Each array, by itself, can add and subtract. To multiply and divide, a first array is used as a divisor or multiplier array, a second array is used as a dividend or multiplicand array, and a third array is used as a quotient or product array.

To perform division, the divisor array is utilized to effectively form the reciprocal of the binary divisor, most significant bit first, by successive approximations. Control circuitry dictates the formation of a shift and add sequence that effectively represents the reciprocal of the divisor by controlling the positioning of the divisor before each addition step with itself so that the product is a series of binary ones. The add and shift sequence obtained, in effect, reflects the reciprocal of the divisor, since multiplying the divisor by its actual reciprocal would also produce a series of binary ones. As each add or shift step is obtained, it is utilized to manipulate the dividend accordingly, thereby generating an increasingly precise approximation of the quotient, most significant bit first. The manipulation of the dividend according to the shift and add sequence obtained is effectively the same as multiplying the dividend by the reciprocal of the divisor, most significant bit first.

To perform multiplication, the multiplier array evolves the particular add and shift sequence to be utilized on the multiplicand in the multiplicand array for generating the product, most significant bit first.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENTS

It would, perhaps, be helpful to the understanding of the specific embodiments of the invention if the reader were familiar with the theoretical bases of the invention. Since the present invention is an extension of and an improvement over the invention described in a copending patent application by the same inventor for Modular Apparatus For Binary Quotient, Binary Product, Binary Sum and Binary Difference Generation having Ser. No. 489,884 filed July 19, 1974, now abandoned in favor of Continuation application Ser. No. 639,517, filed Dec. 15, 1975, the theoretical discussion in that application is equally applicable as the theoretical basis for this invention and should be referred to by the reader.

Figure 1:
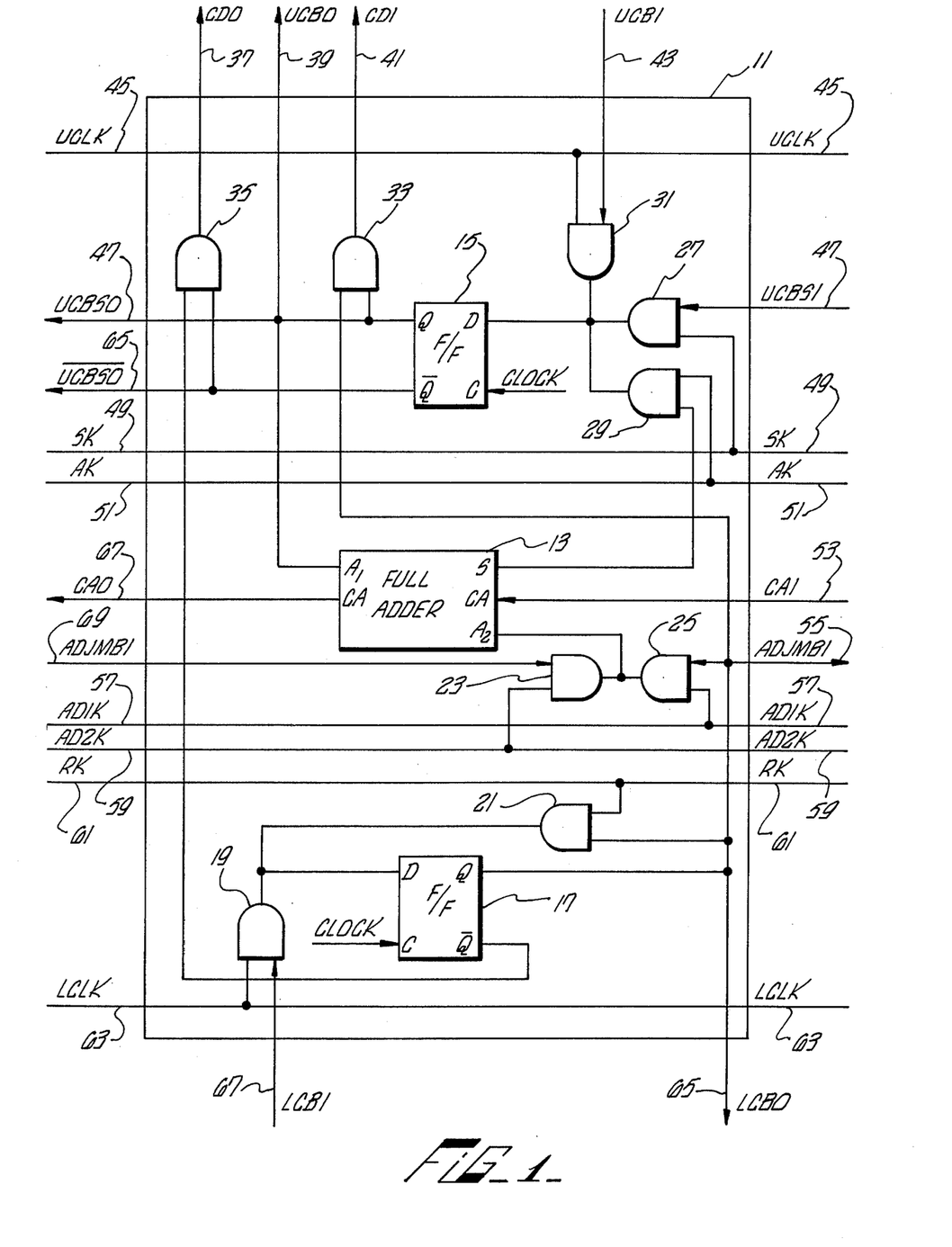
FIG. 1 is a logic circuit diagram for a module that is utilized redundantly in the present invention.

Referring first to FIG. 1, a basic module 11 which is redundantly used in the arithmetic mechanism of the present invention is shown as comprising the basic elements of a full adder 13 and two one-bit storage elements 15 and 17. The storage elements are shown as D-type flip-flops.

The upper flip-flop 15 can receive information from one of three locations. When the Upper Cell Load Control (UCLK) line 45 is high, the flip-flop 15 is loaded from an external source over Upper Cell Bit IN (UCBI) line 43 through AND Gate 31. When Shift Control (SK) line 49 is high, flip-flop 15 is loaded through AND Gate 27 from Upper Cell Bit Shift In (UCBSI) line 47. When Add Control (AK) line 51 is high, flip-flop 15 is loaded through AND Gate 29 from the Sum (S) output of full adder 13. The Q output of flip-flop 15 is supplied to the outside over Upper Cell Bit Out (UCBO) line 39 and to the next most significant module over Upper Cell Bit Shift Out (UCBSO) line 48. The $\overline{Q}$ output of flip-flop 15 is made available over the $\overline{UCBSO}$ line 65.

The lower flip-flop 17 of the module 11 is loaded from one of two sources. When Lower Cell Load Control (LCLK) line 63 is high, flip-flop 17 is loaded from an external source through AND Gate 19 over the Lower Cell Bit In (LCBI) line 67. When Restore Control (RK) line 61 is high, the Q output of flip-flop 17 is applied through AND Gate 21 to its D input, thereby restoring it to its previous state. The Q output of flip-flop 17 is supplied to the outside over Lower Cell Bit Out (LCBO) line 65.

The $\overline{Q}$ output of flip-flop 17 is anded together with the $\overline{Q}$ output of the upper flip-flop 15 by AND Gate 35 to generate a carry detect signal on Carry Detect Zero (CD0) line 37. The Q output of lower flip-flop 17 is anded together with the Q output of upper flip-flop 15 by AND Gate 33 to provide a carry detect signal on Carry Detect One (CD1) line 41. The Q output of flip-flop 17 is also supplied to an adjacent less significant module over Adjacent Module Bit Out (ADJ-MBO) line 55.

The full adder 13 receives three inputs and supplies two outputs. The adder receives a First Add ($A_1$) input from the Q output of the upper flip-flop 15. It receives a Second Add ($A_2$) input from either the Q output of the lower flip-flop 17 or the Q output of the lower flip-flop in an adjacent more significant module. When the Add One Control (AD1K) line 57 is high, the Q output of flip-flop 17 is supplied through AND Gate 25 to the $A_2$ input of full adder 13. When the Add Two Control (AD2K) line 59 is high, the Q output from a lower flip-flop i. The next most significant module is supplied through AND Gate 23 by way of Adjacent Module Bit In (ADJMBI) line 69 to the $A_2$ input of the full adder 13. The full adder receives a carry signal from a less significant module over Carry Input (CAI) line 53. The full adder 13 supplies the sum of the two add inputs $A_1$ and $A_2$ and the carry input CA1 to the upper flip-flop 15. The full adder 13 also supplies a carry signal, if generated, to the next most significant module over Carry Output (CAO) line 67.

Figure 2:
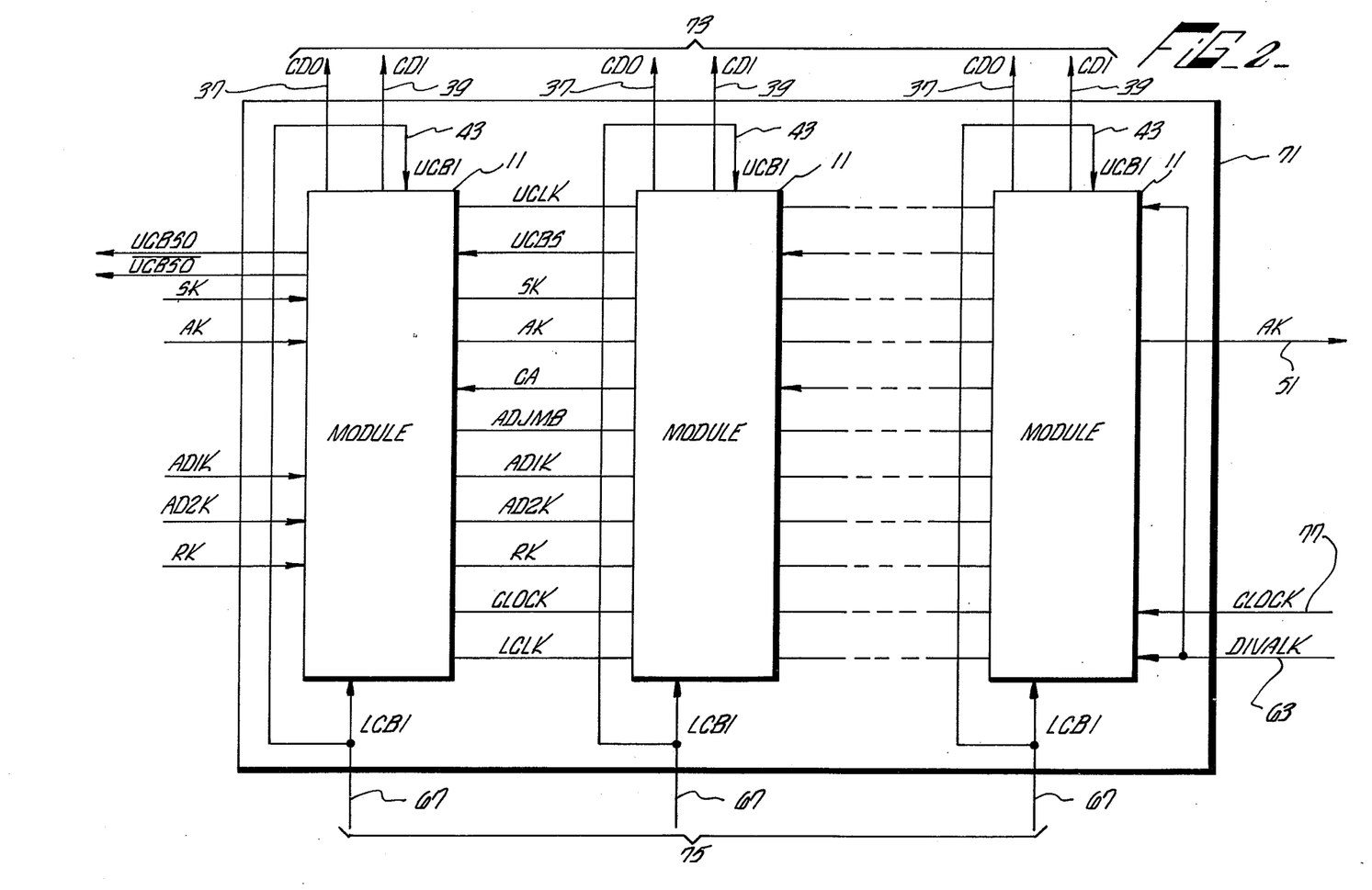
FIG. 2 illustrates in block diagram form the interconnection of a plurality of modules to form a divisor array.

Referring now to FIG. 2, a divisor array 71 for the arithmetic mechanism of this invention is shown as comprising a plurality of like structured modules 11 connected in series, the number of modules at least equaling the number of binary bits in the divisors being processed. It should be understood, of course, that the number of modules can exceed the number of bits in a divisor without changing the operation of the array. It shall be assumed that the left-most module is the most significant module in the array, following Western convention. The divisor is loaded into the array, the most significant bit of the divisor being loaded into the most significant module of the array over lines 75. Since the LCBI and UCBI lines are connected together, the divisor will be loaded into the upper and lower cell registers of the array at the same time. The loading occurs when the Divisor Array Load Control (DIVALK) line 63, which is connected to both the UCLK and LCLK lines, is high. The array receives clock signals over a clock line 77.

Each module in the array supplies a CD0 and CD1 signal over lines 73 to carry detect circuit, which will be described hereinafter. The divisor array supplies the Q and $\overline{Q}$ output of the upper flip-flop in the most significant module of the array over UCBSO and $\overline{UCBSO}$ lines 47 and 65 respectively, to control logic that will be described hereinafter. The control logic, in turn, generates SK and AK signals to be supplied to the divisor array over lines 49 and 51 respectively. This control logic also generates AD1K, AD2K and RK signals to be supplied to the divisor array over lines 57, 59 and 61 respectively. The AK signal supplied to the array on line 51 is also supplied to the carry detect circuit from the divisor array.

Figure 3:
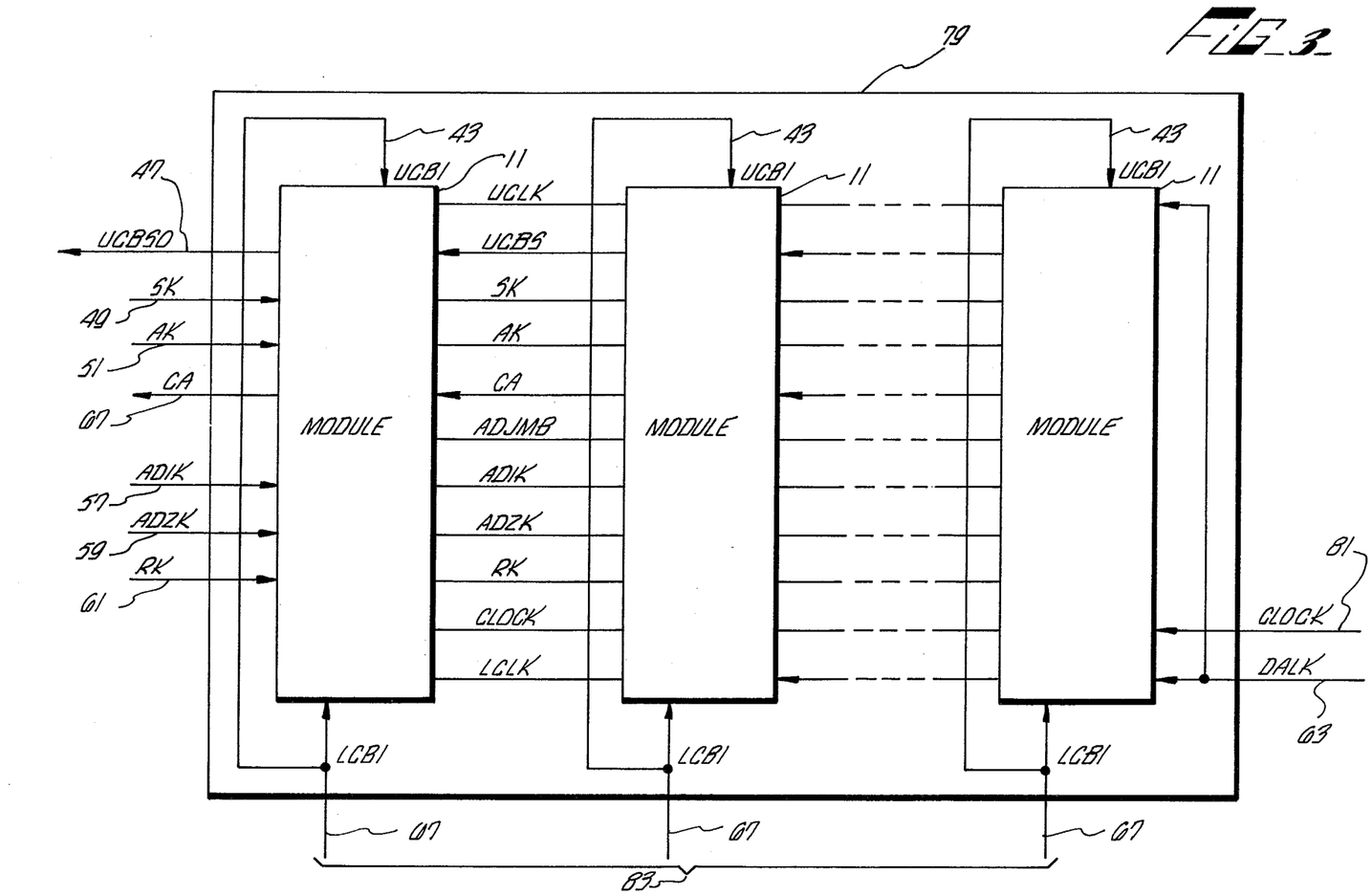
FIG. 3 illustrates in block diagram form the interconnection of a plurality of modules to form a dividend array.

Referring now to FIG. 5, a dividend array 79 is shown as comprising a plurality of like modules 11 connected in series. The dividend is loaded into the dividend array over lines 83, with the most significant bit of the dividend being loaded into the most significant module of the array. The array 79 receives clock signals over a clock line 81 and dividend array load control signals over a Dividend Array Load Control (DALK) line 63. The dividend array load control signal received on line 63 is supplied to the UCLK and LCLK lines at the same time. Since the LCBI line of each module is connected to the UCBI line, the dividend is loaded into the upper cell register and lower cell register of the dividend array simultaneously. The Q output of the upper flip-flop in the most significant module of the dividend array is supplied over UCBSO line 47 to a quotient array. The carry generated by the full adder of the most significant module is also supplied to the quotient array over CA line 51. The control signals SK, AK, AD1K, AD2K and RK are generated by the control logic to be described hereinafter, and are supplied to the dividend array 79 over lines 49, 51, 57, 59 and 61, respectively.

Figure 4:
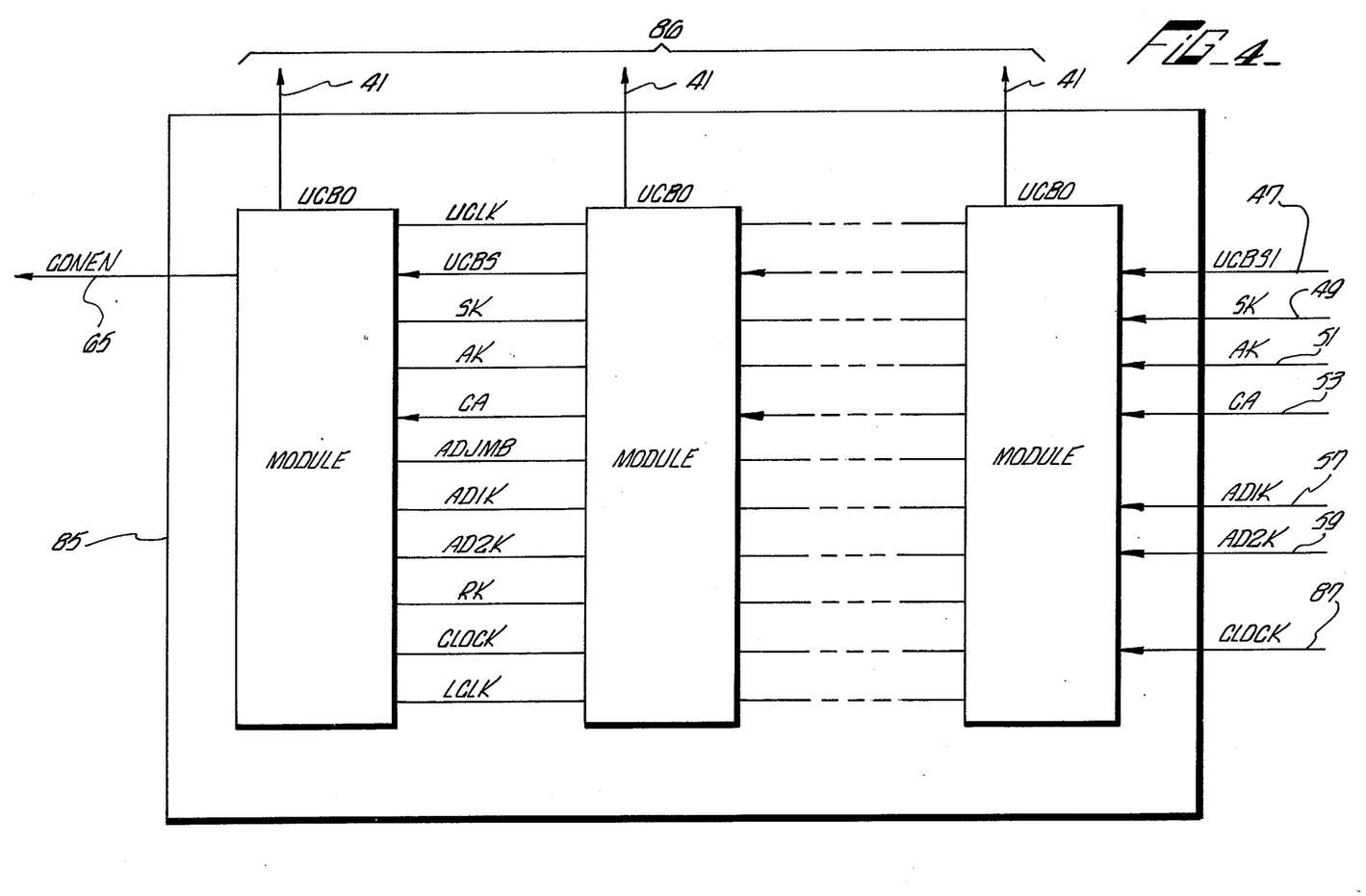
FIG. 4 illustrates in block diagram form the interconnection of modules to form a quotient array.

Referring now to FIG. 4, a quotient array 85 is illustrated as comprising a plurality of like modules 11 connected in series. The UCBO lines 41 of each module supply the quotient output 88 to a bit accuracy equal to the number of modules in the quotient array, the most significant bit being generated by the output of the most significant module, the left-most module in that array 85. The $\overline{Q}$ output of the upper flip-flop in the most significant module generates a control logic enable signal over line 65. Line 65 is the Control Enable (CONEN) line. The quotient array 85 receives the Q output from the upper flip-flop in the most significant module of the dividend array over UCBSI line 47. In addition, the quotient array receives the carry signal from the full adder in the most significant module of the dividend array over CA line 53. The array also receives clock signals over a clock line 87. The SK, AK, AD1K and AD2K control signals generated by the control logic to be described hereinafter are supplied to the quotient array over lines 49, 51, 57 and 59 respectively.

Figure 5:
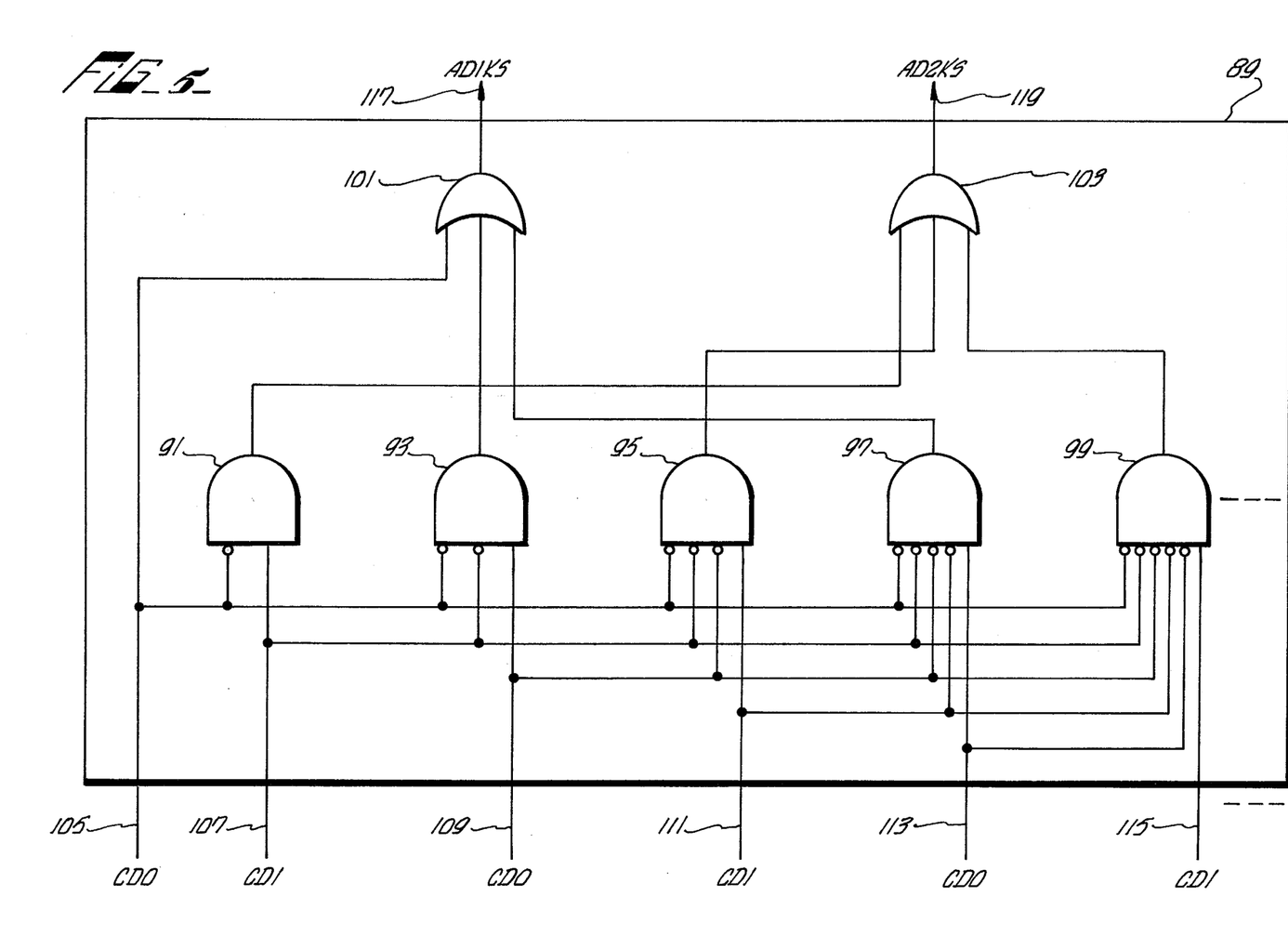
FIG. 5 is a logic diagram of a basic circuit that is redundantly utilized to form a carry detection circuit for this invention.

The AD1K signals and AD2K signals are generated by a carry detector circuit such as shown in FIG. 5. For purposes of example, the carry detector circuit 89 of FIG. 5 is shown to only receive the CD0 and CD1 outputs of three modules. Although, obviously, the logic circuit of the carry detector 89 may be extended to accommodate many more such inputs pairs. Since the logic of the carry detector 89 is combinatorial logic consisting only of AND and OR Gates, the carry detector may easily be manufactured as a singly chip by utilization of present integrated circuit technology.

The function of the carry detector is to generate an add one control signal (AD1KS) on line 117 whenever no module in the divisor array has the same logic level stored in both its upper and lower storage elements, or there is at least one module in the divisor array that has a binary zero stored both in its upper and lower storage elements, in other words, the Q output of both the upper and lower flip-flop is zero while the $\overline{Q}$ output of the respective flip-flops are one and no more significant module has a binary one stored both in its upper and lower storage elements. Conversely, if such is not the case, in other words, if the most significant module storing like values in both storage elements, at the chosen instant in time, is storing a one in both its upper and lower storage elements, then the carry detector logic 89 will generate an add two control signal (AD2KS) on line 119.

For purposes of illustrating the function of the carry detector logic 89, let us assume that the module of the divisor array connected to the CD0 and the CD1 lines 105 and 107 respectively has, at the particular instant in time chosen, a binary zero stored in its upper and lower storage elements. This will produce a high signal level on line 105. The signal level on line 107 will be low. The high signal level on 105 is supplied as an input to OR Gate 101 and will pass through OR Gate 101 to line 117 as an AD1KS signal. The high on line 105 is also supplied to each of the AND Gates 91, 93, 95, 97 and 99 where it is negated at the respective inputs and prevents these AND Gates from generating an output. In other words, AND Gate 93 is prevented from generating a high to be supplied to OR Gate 101 and AND Gate 97 is prevented from generating a high to be supplied to OR Gate 101. To the same end, AND Gate 91, 95 and 99 are prevented from generating any signals to be supplied to OR Gate 103. Therefore, only an add one control signal is generated on line 117, regardless of the conditions in any of the other modules connected to the carry detector.

Assume now that the module connected to the CD0 and CD1 lines 109 and 111, respectively, has a binary one stored in its upper and lower storage elements. In other words, the Q output of these two upper and lower flip-flops is one. Consequently, the CD1 output on line 111 would be a high level and the CD0 output on line 109 would be low. This high output is supplied as a binary one input to AND Gate 95 and as a binary zero input to AND Gates 97 and 99. Assuming that the next most significant module, which would be connected to lines 105 and 107 does not have a similar condition, but rather, has either unlike logic levels in both storage elements or two binary zeroes, the remaining inputs to AND Gate 95 would also all be one since they are zero negated, thereby supplying a binary one for a high signal level to OR Gate 103. This high would be passed through OR Gate 103 as an add two control signal on line 119. If the next most significant module had a binary one stored in both its upper and lower flip-flop, line 107 would be high. Line 105 would be low. This condition would cause AND Gate 91 to produce a high signal level for OR Gate 103. AND Gate 95 would not produce an output. OR Gate 103 in turn would respond by generating an add two control signal (AD2KS) on line 119.

Figure 6:
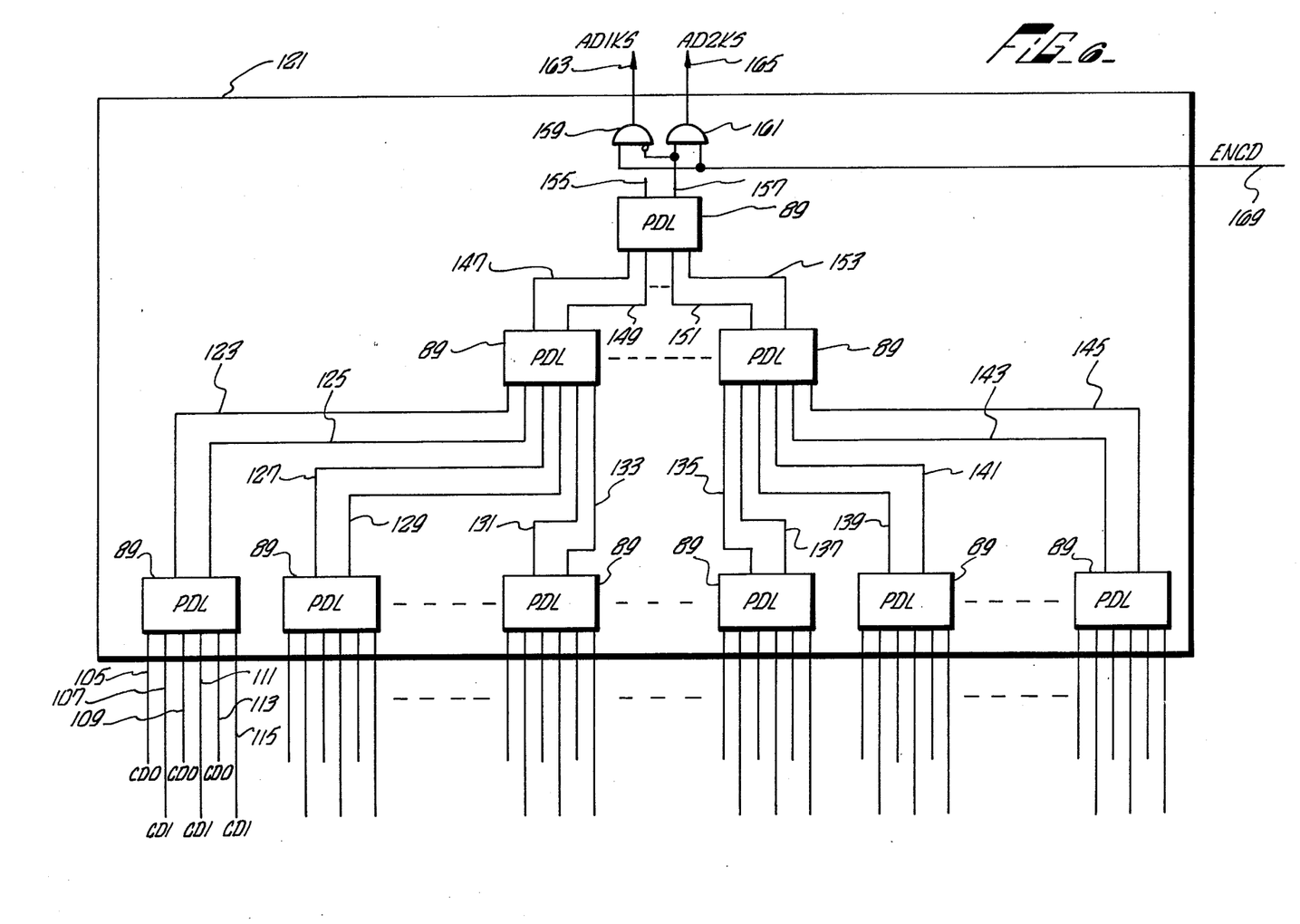
FIG. 6 is a block diagram of the interconnection of a plurality of the logic circuits of FIG. 5 to provide a carry detector for this invention.

Referring now to FIG. 6, an N-bit long carry detector 121 is illustrated as being made up of a plurality of carry detector logic circuits as illustrated in FIG. 5. The two output lines, from the carry detector logic circuits at a first level, 123, 125, 127, 129, 131, 133, 135, 137, 139, 141, 143 and 145 are supplied as inputs to a second level of carry detectors. The outputs 147, 149, 151 and 153 from the second level of carry detectors are supplied to a third level of carry detectors. This third level, in our example, is a single carry detector logic circuit 89 having output lines 155 and 157. The AD2KS signal on line 157 from this logic circuit is supplied to AND Gate 161 and to AND Gate 159 where it is negated. The AD1KS signal on line 155 is not used. When the enable carry detector line (ENCD) 169 is high, enabling AND Gates 159 and 161, either an AD1KS or an AD2KS signal will appear on lines 163, 165 respectively, depending on the signal level on line 157.

Figure 7:
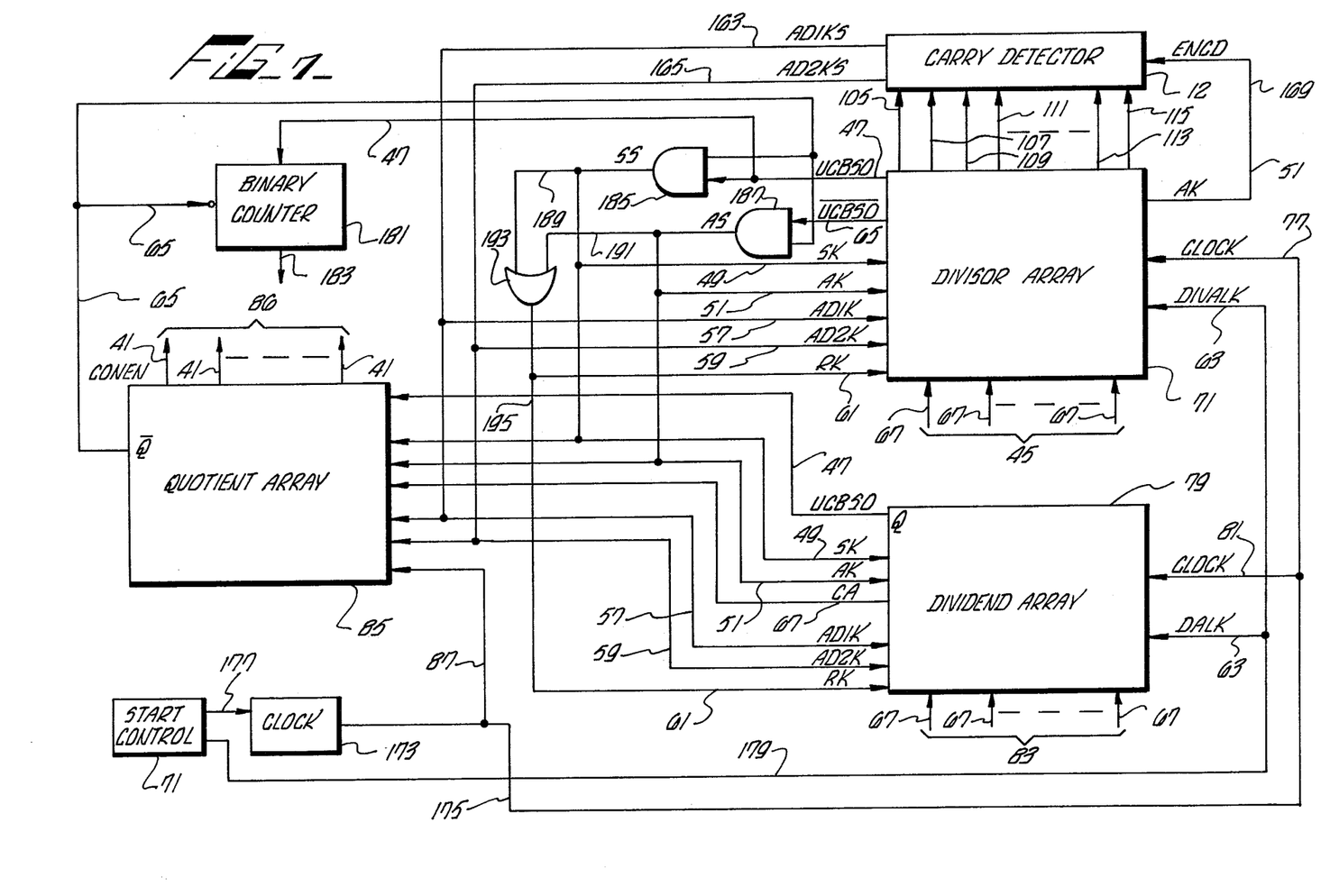
FIG. 7 illustrates in block diagram and logic circuit form the interconnection of a divisor, dividend and a quotient array, along with a carry detector, to provide an apparatus for performing binary division according to the present invention.

Referring now to FIG. 7, a divider mechanism according to this invention is shown as comprising a divisor array 71, a carry detector 121, a dividend array 79 and a quotient array 85.

The divisor is loaded into the divisor array 71 over lines 75. The divisor array receives clock signals over a clock line 77 and divisor array load control signals over DIVALK lines 63. Each module in the divisor array generates a carry detect zero and carry detect one signal which is supplied to the carry detector 121 over lines 105, 107, 109, 111, 113 and 115. The upper flip-flop in the most significant module in the divisor array supplies its Q and $\overline{Q}$ output over UCBSO line 47 and $\overline{UCBSO}$ line 65, respectively, to logic control circuitry.

Upon a high signal level appearing on control enable line 65, AND Gates 185 and 187 are enabled to pass a UCBSO bit as a Shift Signal (SS) or a $\overline{UCBSO}$ bit as an Add Signal (AS) whenever they occur. These signals are supplied to the divisor array as an SK signal and AK signal on lines 49 and 51, respectively. These very same signals are supplied to the quotient array and dividend array as shift and add control signals over lines 49 and 51 respectively. The occurence of either an SS or an AS on line 189 or 191 respectively, will pass through OR Gate 193 to become a Restore Control (RK) signal on 195. This signal is supplied to the divisor array 71 and to the dividend array 79, over line 61. Whenever an AK signal is supplied to the divisor array 71 over line 51, it is also supplied to the carry detector 121 over line 169 as an Enable Carry Detector (ENCD) signal.

The carry detector circuit 121 will determine, whenever an add step is called for, whether the add step is to be a vertical add or a diagonal add. A vertical add is initiated by an AD1KS on line 163. A diagonal add is initiated by an AD2KS on line 165. These signals are supplied to the divisor array, the dividend array and the quotient array over lines 57 and 59. The meaning of an add vertical and add diagonal step will be discussed hereinafter in connection with a specific division example.

The dividend array 79 receives a dividend array load control signal over line 63 and clock signals over line 81. The dividend is loaded into the array 79 over lines 83. The upper flip-flop in the most significant module of the divident array supplies its Q output over UCBSO line 47 to the upper flip-flop in the least significant module of the quotient array 85. Also, the carry output generated by the full adder in the most significant module of the dividend array is supplied over carry line 67 to the carry input of the full adder in the least significant module of the quotient array 85.

The quotient array, in addition to the above mentioned control signals, receives clock signals over a clock line 87 and supplies a quotient over output lines 86 as well as a Control Enable (CONEN) signal over line 65 which is the $\overline{Q}$ output of the upper flip-flop in the most significant module of the quotient array.

Besides being supplied to the logic circuit, the control enable signal is utilized to reset a binary counter 181 that has a modulus equal to one less than the number of modules in the quotient array. This binary counter is incremented by the UCBSO signals over line 47 from the divisor array. If the modulus of the counter 181 is exceeded before it is reset, which occurs at the time the quotient has been completely generated, then the output signal on line 183 of the binary counter indicates that the quotient as represented in floating binary point form falls between ½ and 1. This indication is utilized to correctly place the binary point in the quotient generated. A more comprehensive explanation of the operation of the binary counter will be given in connection with a specific division example hereinafter described.

The clock signals supplied to the dividend, quotient and divisor arrays are generated by a clock source 173 which is initiated by a start control circuit 171 over line 177. The start control circuit also supplies load control signals to the divisor and dividend arrays over line 179. The start control circuit and clock source are seen as well within the purview of a person of ordinary skill in the art. Therefore, no further description regarding these elements will be given herein.

Figure 8:
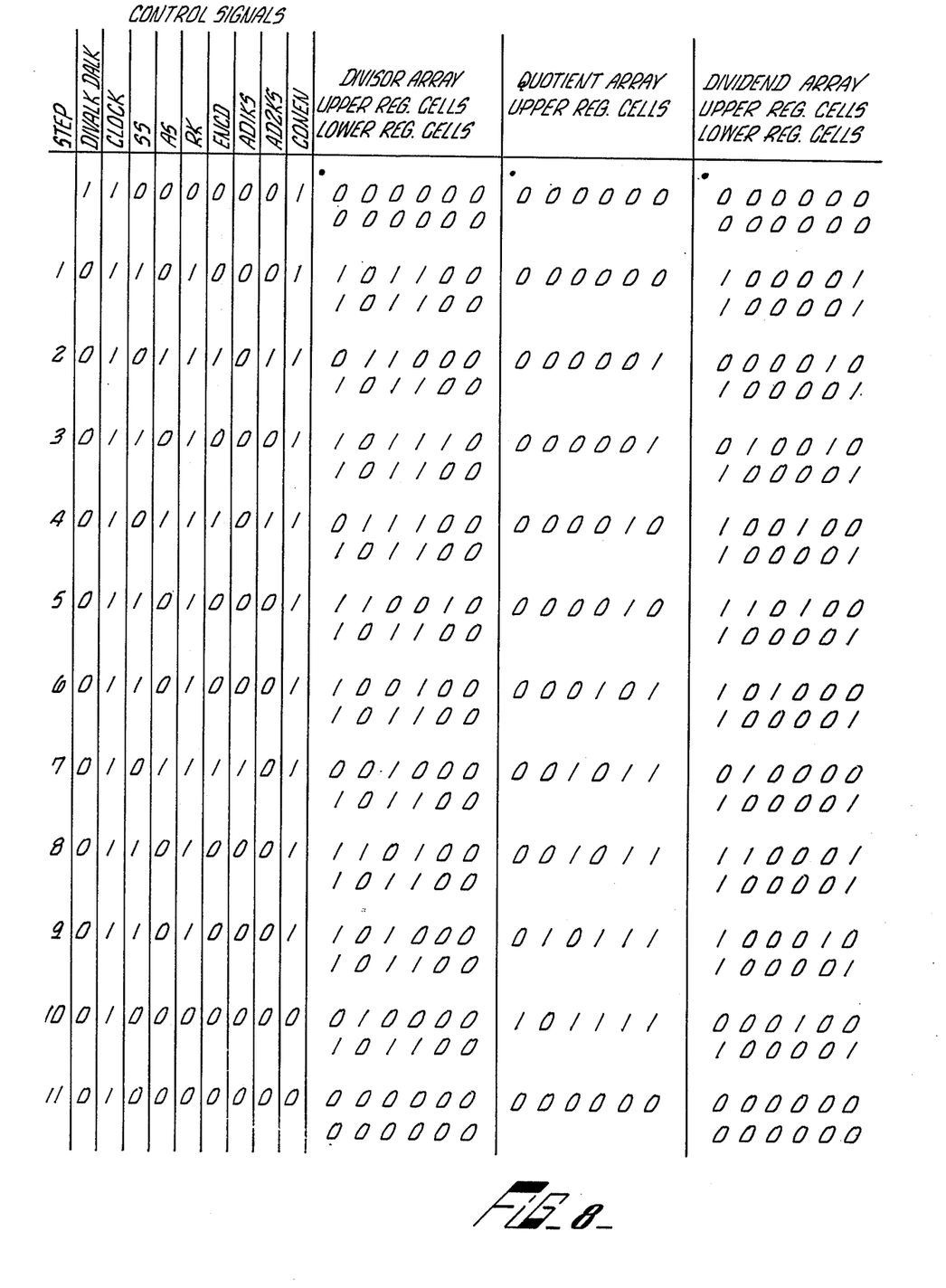
FIG. 8 is an illustration of the states of the apparatus of FIG. 7 during the solution of a specific problem.

Referring now to FIG. 8, the states of the mechanism of FIG. 7 during the division of 33 by 11 is illustrated. In binary form, a divident 100001 is divided by a divisor 1011. The binary answer is 11. The divisor and dividend are loaded into their respective arrays after being manipulated into floating binary point format. In this regard, the binary point in the divisor array, the quotient array and the dividend array can be thought of as being physically located immediately to the left of the most significant module in each of the arrays. Thus, the divisor and dividend always fall within the range between ½ and 1 and the quotient, as a result, will fall within the range of ½ and 2. In binary notation, the ranges are 0.1000 . . . 0 to 0.1111 . . . 1 and 0.1000 . . . 0 to 1.1111 . . . 1. The most significant bit of the divisor and dividend array is always loaded into the most significant module of the respective arrays which is the left-most module in each of the arrays.

The first step in the division process, step 1, is the loading of the divisor and dividend in the upper and lower cell registers of both arrays. As can be seen from the example of FIG. 8, all three arrays, the divisor, the quotient and the dividend array, have been assumed to be six modules long. The second step in the division process is a shift step whereby the divisor and dividend, as stored in the upper cell registers of the respective arrays, are shifted to the left one bit position. The third step consists of a diagonal add as dictated by an add two control signal.

In a diagonal add, the contents of the upper and lower cell registers of the divisor array and the upper and lower cell registers of the dividend array are added together at a left-directed downward-sloping diagonal. This diagonal add step is the equivalent of performing a right shift of the contents of the lower cell registers in both the divisor and dividend array by one bit position and then performing a vertical add. This diagonal add prevents the occurrence of the carry predicted by the carry detector. Steps 4 through 7 are as illustrated in FIG. 8 by the control signals.

Step 8 calls for a vertical add as dictated by an add one control signal. A vertical add is adding the contents of the upper and lower cell registers of both the divisor and dividend array so that the bit stored in the upper storage element of a specific module is added to the bit stored in the lower storage element of that module. This is differentiated from a diagonal add by the fact that in a diagonal add the bit stored in the upper storage element of a specific module is added to the bit stored in the lower storage element of the next most significant module in the array. The procedure continues in this manner until the tenth step.

At the tenth step, the quotient array contains an approximation of the quotient to an accuracy of six binary positions. In this instance, since the divisor, 0.1011, is larger than the dividend, 0.100001, answer, 0.101111 is between ½ and 1. This means that the binary counter 181 of FIG. 7 is not reset before its modulus is exceeded. Thereby, it generates a high on line 183 which inhibits placement of the binary point one extra bit position to the right. The exponent value of the divisor is $2^4$, while the exponent value of the dividend is $2^6$. The result of subtracting these two is $2^2$, which places the binary point in the quotient two positions to the right, leaving an answer of 10.1111 which approximates 3 to the precision determined by the module length of the network, in this case 6. At the eleventh step, the clock pulse clears all arrays in preparation for the next division problem.

Figure 9:
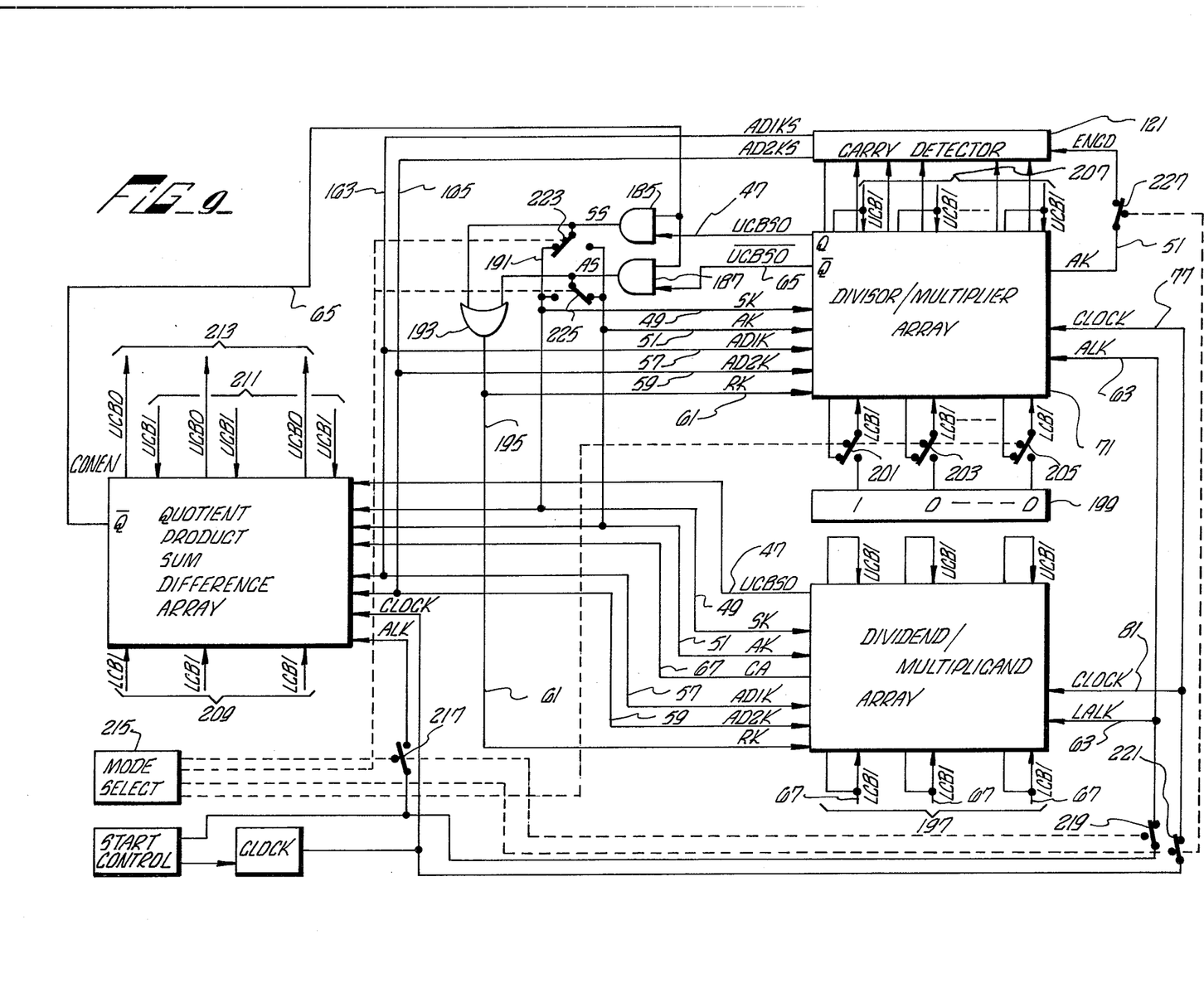
FIG. 9 illustrates in block diagram and logic circuit form the interconnection of three like arrays and a carry detector circuit to perform either division, multiplication, subtraction or addition.

Referring now to FIG. 9, an arithmetic mechanism that can perform division, multiplication, addition and subtraction is shown as comprising three like arrays 71, 79 and 85 and a carry detector circuit 121. A mode select circuit 215 that determines whether the arithmetic apparatus is to operate as a divider, multiplier, adder or subtracter functions to open or close a plurality of switches located in various places in the arithmetic mechanism. The switches, as shown in the figure, are in their normal, or home, position. In this position, the arithmetic mechanism is adapted to operate as a divider mechanism identically to the manner described in connection with FIGS. 7 and 8.

Assume now that multiplication is desired and the mode select circuit, which is seen as well within the purview of a person of ordinary skill in the art, is set for the multiplication mode. This causes switch 223 to connect line 189 to line 196 and causes switch 225 to connect line 191 to line 194. Also, switches 201, 203 to 205 are moved so that the contents of a register 199 is connected to the LCBI lines of the multiplier array 71. Switches 227, 219, 221 and 217 remain in the positions illustrated.

Thus adapted, the arithmetic mechanism of FIG. 9 will perform multiplication. The multiplier is loaded into the multiplier array 71 over input lines 207. The multiplicand is loaded into the multiplicand array 79 over input lines 197. The product, or answer, is retrieved from the product array 85 over output lines 213.

Figure 10:
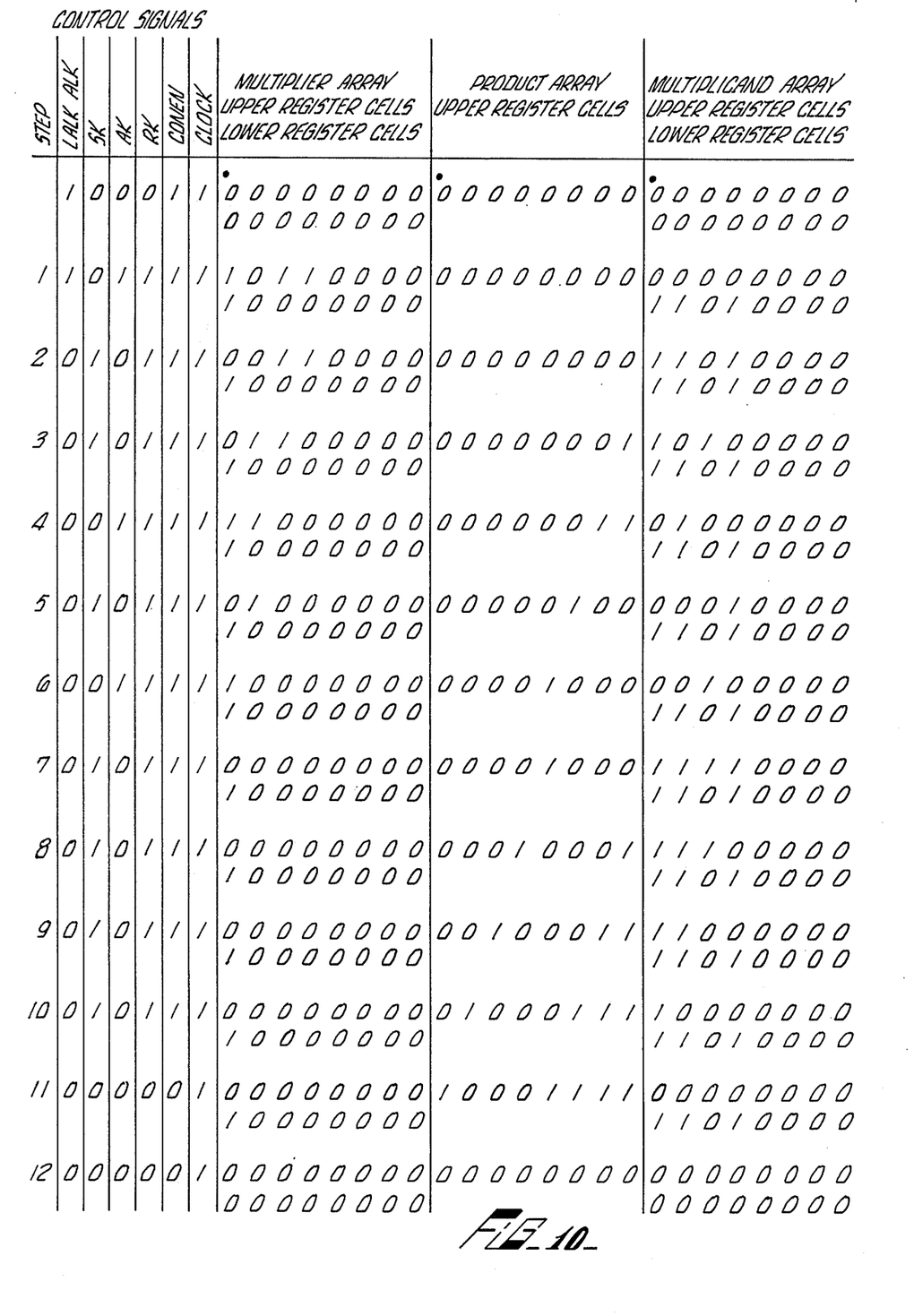
FIG. 10 is an illustration of the states of the apparatus of FIG. 9 during generation of a solution for a specific multiplication example.

FIG. 10 illustrates the states of the elements of the arithmetic mechanism shown in FIG. 9 when multiplying 11 times 13 to produce the answer 143. The multiplier and the multiplicand are loaded into their respective arrays in floating binary point format. The multiplier is loaded into the upper cell register of the multiplier array, the lower cell register of that array being loaded with a binary one in themost significant cell position of that register. This binary one is restored and utilized during each add step of the shift and add sequence generated, in order to produce a shift control signal after each add control signal. The multiplicand is loaded into only the lower cell register of the multiplicand array. The state of the multiplier, product and multiplicand arrays, after the arrays are loaded with the appropriate multiplier and multiplicand is shown at step 1. Step 11 indicates that the answer is 143.

As in the division example, the binary point can be thought of as physically located immediately to the left of the most significant module on each array. The twos exponent of the multiplier is four. The twos exponent of the multiplicand is four. Upon summing these exponents, an exponent of eight is generated for the product. This exponent causes the moving of the binary point 8 positions to the right from where it is physically located in the product array. This produces an answer of 10001111 . . The twelfth step clears all arrays and prepares the mechanism for the next multiplication problem.

Assuming now that the mode select circuit 215 was switched to the add mode or subtract mode, switch 217 would close and switches 219, 221 and 227 would open. The arithmetic apparatus of FIG. 9 is illustrated as only utilizing one array to produce a difference or a sum. It should be understood, however, that any or all three of the arrays shown, that is, array 85, array 79 and array 71 may be used to produce a product or sum. Only one array is shown as adapted for this purpose in order to simplify the drawing and the explanation.

To add two binary numbers together, the addend would be loaded into the sum array 85 at input lines 211. The minuend would be loaded into the sum array at input lines 209. The sum would be generated at output lines 213.

To subtract a pair of numbers, the twos complement of those numbers must be taken first. Apparatus to generate the twos complement of a number is seen as well within the purview of a person of ordinary skill in the art and will not be further discussed herein. Upon taking the twos complement, the subtrahend would be loaded into the difference array 85 at input lines 211 and the augend would be loaded into the difference array 85 at lines 209. The difference, in twos complement, would be generated at output lines 213. An alternative to utilizing twos complement apparatus would be the utilization of a full adder/subtracter mechanism in place of the full adder illustrated. These adder-subtracter circuits are well known and readily available manufactured items, the mode of operation being selected electrically.

In summary, an improved high-speed divider mechanism for binary numbers that has highly redundant structure has been illustrated. In addition, an arithmetic mechanism that performs division and multiplication, most significant bit first, has been illustrated. It should be understood, of course, the foregoing disclosure relates only to preferred embodiments of the invention and that numerous modifications may be made therein without departing from the spirit and the scope of the invention as set forth in the appended claims.

What is claimed is:

1. An arithmetic mechanism for binary numbers, comprising:

a first array comprising a plurality of like structured modules;

means to fill said first array with signals corresponding to a first operand;

a second array comprising a plurality of like structured modules, like the modules in said first array;

means to fill said second array with signals corresponding to a second operand;

a third array comprising a plurality of like structured modules, said third array providing an arithmetic result;

first control means responsive to said first array for generating signals corresponding to a shift, vertical add and diagonal add sequence of steps for said first and second arrays; and second control means for selecting between first and second modes of operation of said first control means, selection of said first mode causing said first control means to generate signals corresponding to the said sequence required for division of the signals in said second array by the signals in said first array to develop said arithmetic result and selection of said second mode causing said first control means to generate the said sequence required for multiplication of the signals in said second array by the signals in said first array to develop said arithmetic result.

2. The arithmetic mechanism for binary numbers of claim 1, wherein said first array, said second array, and said third array each comprises a serial array of like modules.

3. The arithmetic mechanism of claim 2, wherein each module in said first and second arrays comprises:
- an upper one bit storage element;
- a lower one bit storage element; and
- a full adder receiving a first input from said upper element, a second input from said lower element, a third input from the lower element of the adjacent more significant module and a carry input from the adjacent less significant module, said adder supplying, to said upper element, for one value of the carry input, the sum of the first and second inputs and for the other value of the carry input, the sum of the first and third inputs, said adder having a carry output to the adjacent more significant module.

4. The arithmetic mechanism of claim 3, further comprising:
- means for placing and maintaining a binary one in the lower one bit storage element in the most significant module in said first array when said second mode of operation is selected by said second control means to generate the signals corresponding to the sequence required for multiplication.

5. A divider for performing division of a divisor into a dividend to produce the quotient thereof comprising:
- a first plurality of storage cells;
- a second plurality of storage cells;
- means for initially storing said divisor in said first plurality of storage cells with the most significant bit of the divisor located in the next most significant cell thereof;
- means for initially storing said dividend in said second plurality of storage cells;
- divisor adding and shifting means for adding said divisor to the contents of said first plurality of storage cells and for storing the results therein in response to a first bit value in the most significant cell of said first plurality of storage cells and for shifting the contents of said first plurality of storage cells one bit position toward said most significant cell in response to a second bit value in said most significant cell;
- dividend adding and shifting means for adding said dividend to the contents of said second plurality of storage cells and for storing the results therein in response to said first bit value and for shifting the contents of said second plurality of storage cells in response to said second bit value;
- carry detector means responsive to the bits of said divisor and the bits stored in said first plurality of storage cells for producing first and second add control signals;
- means for controlling said divisor adding and shifting means to add vertically in response to said first add control signal and diagonally in response to said second add control signal;
- means for controlling said dividend adding and shifting means to add vertically in response to said first add control signal and diagonally in response to said second add control signal; and
- means responsive to the results of said dividend adding, said dividend shifting, said first and second bit values and said first and second add control signals for generating signals representative of said quotient.

* * * * *

UNITED STATES PATENT AND TRADEMARK OFFICE
CERTIFICATE OF CORRECTION

PATENT NO. : 4,025,773

DATED : May 24, 1977

INVENTOR(S) : Walter Scott Bennett

It is certified that error appears in the above-identified patent and that said Letters Patent are hereby corrected as shown below:

Col. 1, line 42, change "taken" to --taking--.
Col. 3, line 41, change "IN" to --In--.
Col. 4, line 15, change "i" to --in--;
        change "The" to --the--;
    line 46, between "carry" and "detect", insert --a--;
    line 59, change "FIG. 5" to --FIG. 3--.
Col. 5, line 43, change "singly" to --single--.
Col. 7, line 14, change "occurence" to --occurrence--;
Col. 7, line 36, change "divident" to --dividend--.
Col. 8, line 8, change "divident" to --dividend--;
    line 61, after "0.100001," insert --the--.
Col. 9, line 44, change "themost" to --the most--.

Signed and Sealed this thirtieth Day of August 1977

[SEAL]

Attest:

RUTH C. MASON
Attesting Officer

C. MARSHALL DANN
Commissioner of Patents and Trademarks